United States Patent
McIntosh et al.

[15] 3,684,168
[45] Aug. 15, 1972

[54] MIXING VALVE CONSTRUCTION, SYSTEM AND METHOD

[72] Inventors: Harold A. McIntosh, South Pasadena; Gordon K. Slocum, Downey, both of Calif.

[73] Assignee: Robertshaw-Controls Company, Richmond, Va.

[22] Filed: Feb. 20, 1970

[21] Appl. No.: 16,631

Related U.S. Application Data

[60] Division of Ser. No. 716,557, March 27, 1968, abandoned, and a continuation of Ser. No. 18,362, Feb. 26, 1970, Pat. No. 3,610,279.

[52] U.S. Cl. ............................. 236/12 A, 236/80
[51] Int. Cl. ............................... G05d 11/16
[58] Field of Search ......... 236/12 A, 12, 80; 137/337; 251/38

[56] References Cited

UNITED STATES PATENTS

| | | | |
|---|---|---|---|
| 2,216,346 | 10/1940 | Hedmark | 236/12 |
| 2,604,905 | 7/1952 | Myer | 251/38 |
| 2,978,181 | 4/1961 | Noakes | 236/12 A |
| 2,503,901 | 4/1950 | Chace | 236/12 X |
| 2,826,367 | 3/1958 | Cobb | 236/12 |

*Primary Examiner*—William E. Wayner
*Attorney*—Auzville Jackson, Jr., Robert L. Marben and Candor, Candor & Tassone

[57] ABSTRACT

This application discloses a valve construction having a modulating pilot diaphragm fluid control which cooperates with an adjustable pilot which remains stationary after adjustment to control the flow of the fluid. This valve construction may be used in a construction having a hot water inlet, a cold water inlet, a mixing chamber connected to said cold water inlet and said hot water inlet, a hot and mixed water outlet connected to said mixing chamber, and a variable flow control construction controlling the flow of cold water from said cold water inlet to said mixing chamber. This variable flow control construction may be a modulating control construction, so that the water flow from the cold water inlet may be modulated to the desired volume to produce the desired mixture of hot and cold water at the mixed water outlet. Other fluids, instead of hot and cold water, may be controlled and mixed by the valve construction. More than two fluids may enter more than two inlets in the valve construction. A flexible variable orifice means may be used adjacent one or more of the inlets. The valve construction may be unitary or homogeneous, such as a casting.

7 Claims, 22 Drawing Figures

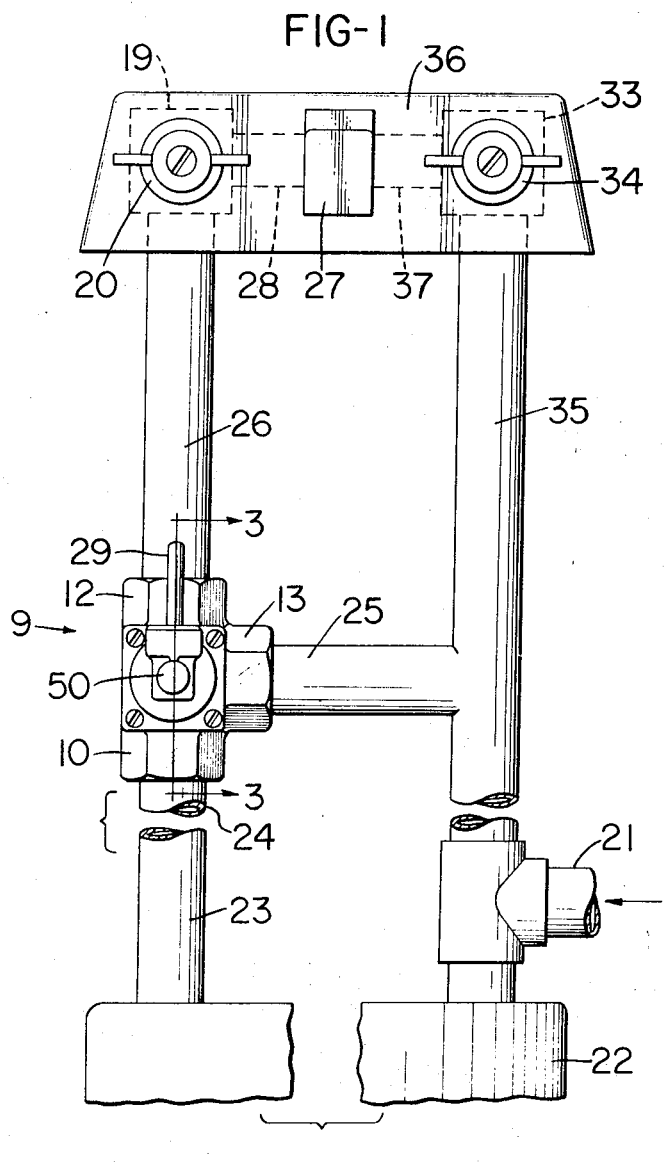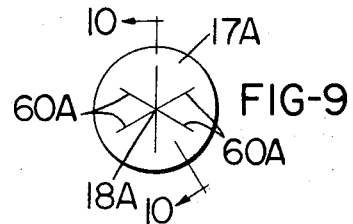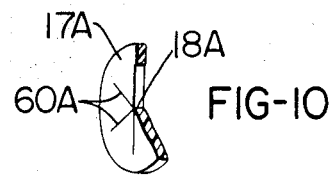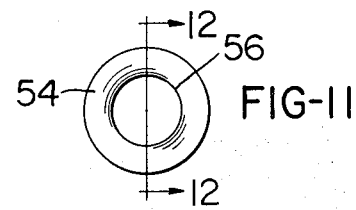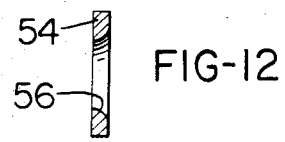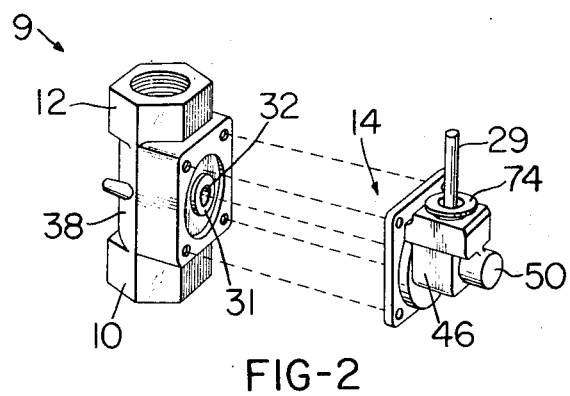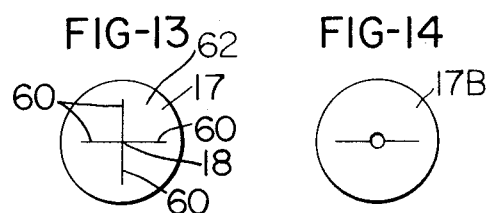

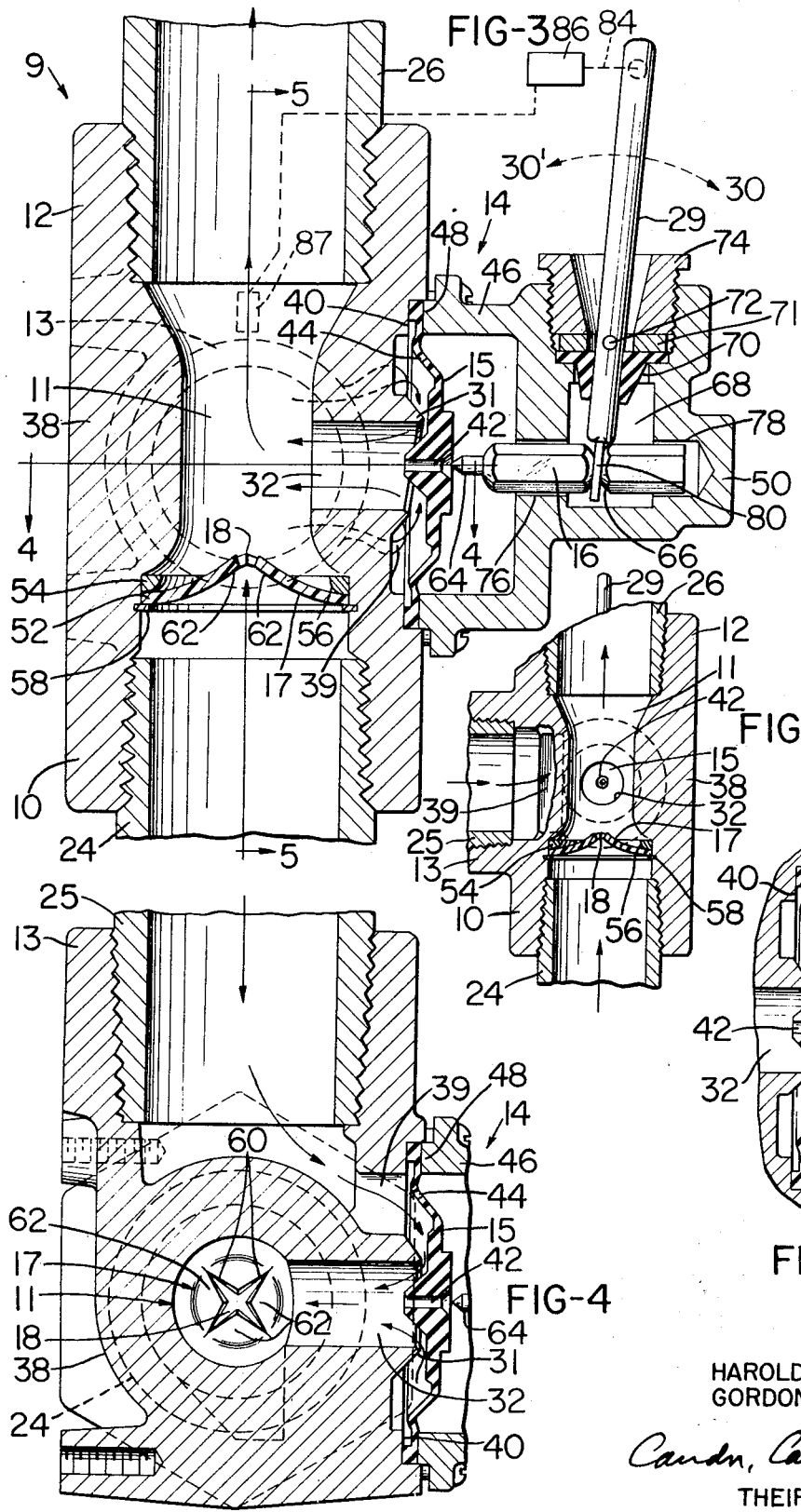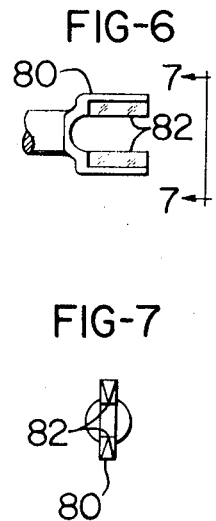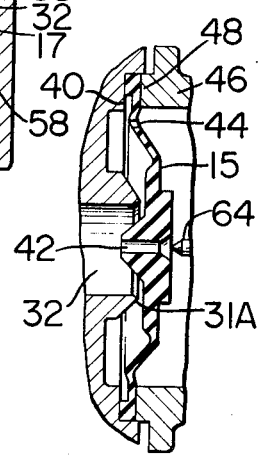

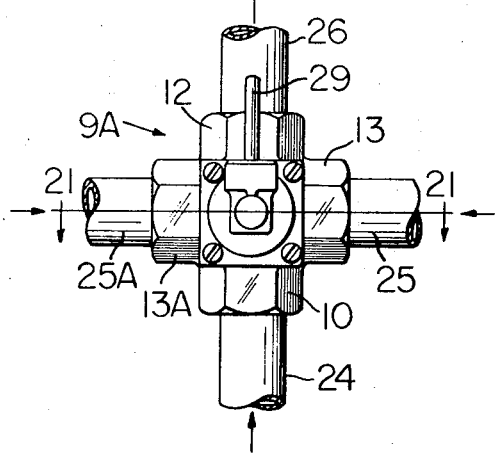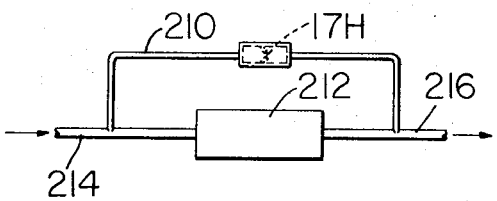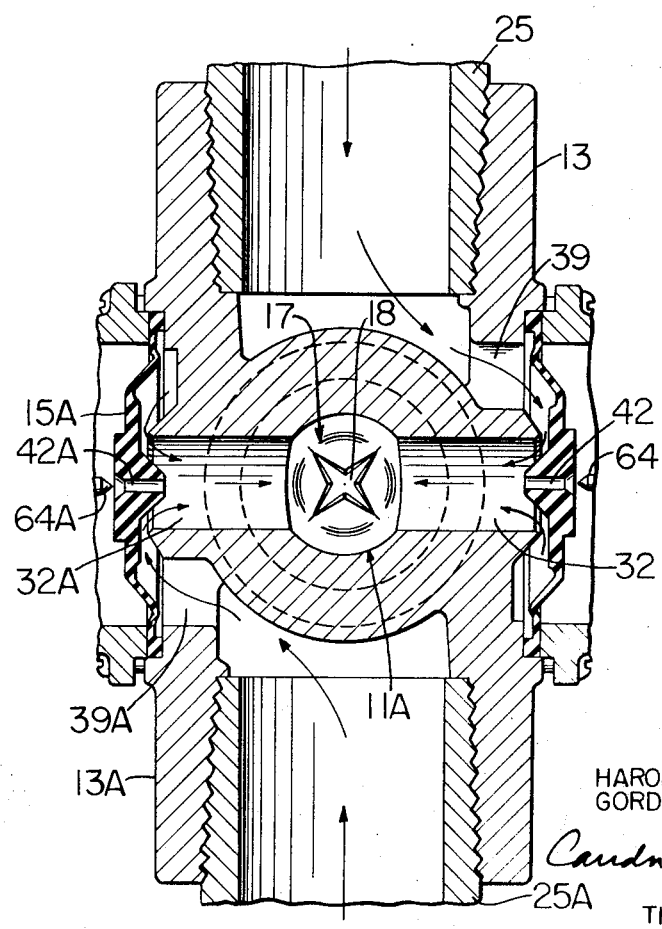
INVENTORS
HAROLD A. McINTOSH
GORDON K. SLOCUM
THEIR ATTORNEYS

MIXING VALVE CONSTRUCTION, SYSTEM AND METHOD

This application is a divisional patent application of its co-pending patent application, Ser. No. 716,557, filed Mar. 27, 1968, now abandoned in favor of its continuation application, Ser. No. 18,362, filed Feb. 26, 1970, now U.S. Pat. No. 3,610,279, and is assigned to the same assignee to whom the parent application is assigned.

This invention relates to a fluid mixing valve construction, system and method.

A feature of this invention includes a variable orifice means to be used where desired, such as in any of the fluid inlet means to be described.

Another feature of this invention includes a valve construction having a modulating pilot diaphragm fluid control which cooperates with an adjustable pilot which remains stationary after adjustment to control the flow of the fluid.

Another of the features of this invention includes a fluid flow valve construction, system and method including a first fluid inlet means, a second fluid inlet means, a fluid mixing means connected to said first fluid inlet means and to said second fluid inlet means, a first fluid and a mixed fluid outlet means connected to said mixing means, and variable control means controlling the flow of said second fluid through said second fluid inlet to said mixing means.

Another feature of this invention includes the control of hot water as the first fluid, and of cold water as the second fluid in the construction of the above feature.

More than two fluid inlet means with one or more variable orifice means may be provided for the mixing means.

Other features of this invention are apparent from this description, the appended claimed subject matters, and/or the accompanying drawing in which:

FIG. 1 is a diagrammatic illustration of a fluid or water flow system of this invention.

FIG. 2 is an exploded diagrammatic view of the mixing valve construction shown in FIG. 1.

FIG. 3 is a diagrammatic cross section of the fluid flow valve of FIG. 1, taken along the line 3—3 of FIG. 1.

FIG. 4 is a cross section along the line 4—4 of FIG. 3.

FIG. 5 is a cross section along the line 5—5 of FIG. 3.

FIG. 6 is a detailed view of the lower end of the actuator or control rod shown in FIG. 3.

FIG. 7 is an end view along the line 7—7 of FIG. 6.

FIG. 8 is a cross section of a modified cold water inlet orifice.

FIG. 9 is a plan view of a typical hot water variable orifice construction using six radial slits, which may be used in FIGS. 3–5.

FIG. 10 is a combined perspective view and cross section along the line 10—10 of FIG. 9.

FIG. 11 is a plan view of a retaining ring for the variable orifice construction.

FIG. 12 is a cross section along the line 12—12 of FIG. 11.

FIG. 14 is a plan view of another modified variable orifice.

FIG. 13 is a plan view of another modified variable orifice, using only four radial slits, as shown in FIG. 4.

FIG. 20 shows a valve construction with more than two inlets.

FIG. 21 is an enlarged cross-section taken along line 21—21 of FIG. 20.

FIG. 22 shows another application of the variable orifice means.

Figure 15:
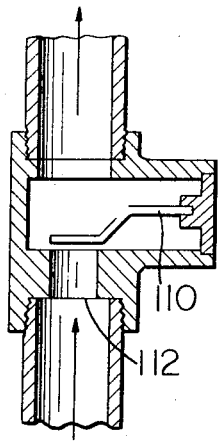
FIGS. 15–18 show cross sections of other embodiments of the variable orifice.

This invention may be used in connection with the control of the flow and mixing of fluids, whether such fluids are gaseous or liquid. A resilient variable orifice means may be used in the inlet means of a valve construction. Such valve construction may be relatively small, such as is used in buildings such as houses, apartments, and the like, or it may be of relatively large size, such as for commercial and industrial types of buildings.

The invention, including the variable orifice means will be described specifically in connection with a valve construction with hot and cold water as the fluids being controlled, but it is to be understood that other constructions and other fluids may be controlled and such fluids may be gaseous and/or liquid, as desired.

Referring to the drawings, this invention may include a fluid mixing valve construction or means 9 through which a first fluid, such as hot water, enters at a first fluid or hot water inlet means 10, and passes through a first fluid and second fluid, or hot and cold water mixing chamber or means 11, where the hot water can be mixed with cold water. From there the hot water alone, or mixed with cold water, can be discharged through a first fluid or hot water or a mixed fluid or mixed hot and cold water outlet means 12. The second fluid or cold water may enter through a second fluid or cold water inlet means 13, flow through a second fluid or cold water varying or modulating valve construction or means 14 into the mixing chamber 11. The modulating valve construction 14 may include a diaphragm means 15 and a regulating pilot plunger means 16 which may be adjusted toward and away from the diaphragm 15 to regulate or modulate the flow of cold water into the mixing chamber 11. The construction is such that the adjustment of the plunger 16 governs the ratio of hot and cold water which is discharged at the mixed water outlet 12.

While the valve construction 9 thus far described is of great advantage, a further improvement may be obtained by providing a variable orifice member or means 17 in the hot water inlet 10. This member 17 is responsive to the volume of flow of the hot water in inlet means 10 so that its effective orifice 18 decreases in water flow resistance when a relatively large volume of hot water passes such orifice 18 and increases its water flow resistance when a relatively small volume of hot water passes the orifice 18. This variation of resistance may be obtained by constructing the orifice member 17 so that the orifice 18 increases in size and decreases in resistance when such relatively large volume of hot water passes the orifice 18 and decreases in size and increases in resistance when said relatively small volume of hot water passes such orifice 18. In the embodiment shown in FIGS. 1–13, the orifice member 17 is a flexible or resilient disc that flexes or otherwise changes in response to hot water flow to obtain such orifice size variation. The word "flexible" when hereafter used is intended to be used as "resilient."

The valve construction 9 with the cold water modulating valve construction 14 and the hot water variable flow resisting orifice member 17 is of particular advantage when used for mixing fluids, such as hot and cold water, from the inlets 10 and 13 which have substantially equal pressures at such inlets 10 and 13 but have different characteristics, such as different temperatures, at such hot and cold water inlets 10 and 13. This advantage occurs particularly when the hot water and mixed hot and cold water outlet 12 is connected to a volume flow regulating discharge valve 19 which may regulate the volume of hot water and mixed cold and hot water leaving the mixing chamber 11 through such water outlet 12.

In a valve construction 9 that is not provided with the variable orifice member 17, the ratio of hot and cold water leaving the mixed outlet 12 varies when the volume of flow is varied by changing the valve opening or flow rate of discharge valve 19. It has been found that when a smaller volume of flow is selected at valve 19, by turning handle 20, the temperature of the mixture rises materially and when a larger volume is selected at valve 19 the mixture temperature falls materially. This happens even if the hot water and cold water pressures at their respective inlets 10 and 13 remain equal and their respective inlets 10 and 13 remain equal and their respective temperatures remain unchanged, and while the modulating valve construction 14 also is unchanged.

These conditions prevail in the usual hot and cold water systems in buildings, such as houses, apartments, and commercial buildings and the like.

For example, such buildings may be provided with a cold water supply main source or pipe 21 which may be directly or indirectly connected to all of the cold water pipes or branches of the building, and supplies such pipes or branches with cold water of a generally constant temperature, particularly when such water has been run off at the various faucets to obtain such generally constant or satisfactory constant cold water temperature, within reasonable limits, as is well known and expected. Such cold water supply 21 may be connected as shown to any well known heating means or water heater 22, which may be thermostatically controlled if desired, to maintain the hot water leaving in the hot water pipe 23 at a generally constant hot water temperature with certain immaterial variations within reasonable limits. This hot water from pipe 23 may be distributed to various hot water pipes or branches of the building which, in turn, are connected to various hot water discharge valves and faucets.

According to this invention, one of these hot water pipes or branches 24 may be connected to the hot water inlet 10 of the mixing valve construction 9, and one of the cold water branches 25 may be connected to the cold water inlet 13 of the mixing valve construction 9. The hot or mixed hot and cold water outlet 12 may be connected to pipe 26 and indirectly to discharge valve 19, which may be connected to a discharge faucet 27 by connection 28.

The mixing valve construction 9 is such that the user may adjust the modulating rod 29 to adjust the plunger 16 and action of diaphragm 15 so that the water discharged through the pipe 26, valve 19 and faucet 27 is all hot water from hot water pipe 23 by adjusting the upper end of rod 29 rightwardly in direction 30, to an all hot position which closes the diaphragm 15 completely against the cold water inlet or valve seat orifice wall 31, as more fully elsewhere described.

The user may select to have a mixture of hot and cold water mixed at mixing chamber 11 and delivered at valve 19 and faucet 27. This is accomplished by adjusting the upper end of rod 29 leftwardly or in direction 30' to reduce the mixed water temperature by increasing the amount of cold water that enters into valve seat orifice wall 31 and cold water passageway 32 into mixing chamber 11. Thus modulation of the upper end of rod 29 in arrow direction 30' decreases the temperature of the mixed water at outlet 12 and faucet 27 and modulation of the rod 29 in arrow direction 30 increases the mixed water temperature. Modulation of rod 29 to the farthest position in direction 30 closes the diaphragm 15 against valve seat 31 and prevents any cold water from entering the mixing chamber 11, so that only hot water can flow from hot water inlet 10 to outlet 12 and faucet 27.

If desired, an all cold water valve 33 may be provided which may be opened and closed by knob or handle 34 and which is connected by cold water branch pipe 35 to the cold water supply 21.

The water discharge fixture 36 may be any desired type of water discharge fixture. As shown in FIG. 1, the valves 19 and 33 may be connected by connections 28 and 37 with the common discharge faucet 27. Such fixture 36 may be any well-known fixture of this type. However, the fixture 36 may be of any other well-known type, such as a shower head, or a fixture having separate faucets for valves 19 and 33, or any other fluid discharging fixture or construction as desired.

THe fluid flow or valve construction 9 may include a unitary or homogeneous valve casing or any desired material in which there is provided the cylindraceous hot water inlet wall 10, and the cylindraceous mixing chamber wall 38 connected and aligned with said hot water inlet wall 10. The cylindraceous mixed water outlet wall 12 is connected to and aligned with said mixing chamber wall 38. The cylindraceous cold water inlet wall 13 may be perpendicular to and supported by the mixing chamber wall 38. The fixed cold water diaphragm seat orifice wall 31 is formed in the mixing chamber wall 38 and is connected to cold water flow relationship by cold water passageway 39 to the said cold water inlet wall 13 and to the mixing chamber 11 and wall 38 by passageway 32. The said diaphragm seat orifice wall 31 may be surrounded by a diaphragm support wall 40. Such walls 31 and 40 may be integrally or homogeneously formed together and may be a part of chamber wall 38.

The diaphragm 15 may have a pilot opening construction 42 and a bleed opening construction 44.

A pilot chamber means 46 sealingly holds the diaphragm 15 on the diaphragm support wall construction 40 by means of its rim 48. The pilot plunger or plunger means 16 is reciprocable in the pilot chamber means 46 toward and away from the pilot opening construction 42 to modulate the flow of cold water through the fixed orifice wall 31 and thus modulate the ratio of mixture of cold water with hot water which enters the mixing chamber 11 and is discharged as mixed water or only hot water through the outlet 12.

The said pilot chamber means 46 may be a cylindraceous diaphragm engaging sealing wall, which has a rim 48 for holding the diaphragm 15 against the diaphragm support wall 40.

The pilot chamber means 46 has a pilot plunger bearing means 50 in which the pilot means 16 reciprocates back and forth.

The hot water inlet wall 10 may be provided with the variable hot water orifice construction 17, or 17A or 17B. Such orifice construction may be a resilient member or rubber disc 17 which may be held at the rim 52 on one side of the disc 17 by the backing member or ring 54, which may be provided with a rounded backing wall 56. The rubber disc 17 may be held in place on the other side by an outwardly biased split C-ring 58 which is expanded in a suitable groove to receive the same as shown.

The resilient member 17 may have a plurality of radial slits 60, which permit the resilient member 17 to yield to the downstream flow of hot water, as illustrated in FIG. 3, to provide a variable orifice 18, as illustrated in FIGS. 3 and 4. The tongues 62 between the radial slits 60 bulge upwardly, as shown in FIGS. 3 and 4, so that the orifice 18 enlarges as the valve 19 is opened wider to decrease the resistance to the flow of hot water into the mixing chamber 11 as compared to the resistance when the valve 19 is not widely opened.

The mixing chamber wall 38 is inwardly bulged to make the mixing chamber narrower than the inner diameter of the inlet 10 or outlet 12 or the inner diameter of the pipes 24 and 26. This also tends to create a suction action on the cold water passageway 32 to induce the flow of cold water from cold water inlet 13 into mixing chamber 11 in spite of the substantially equal pressures of the hot and cold water in hot water pipe 24 and cold water pipe 25.

The plunger 16 has a pointed reduced size end piece 64 which cooperates with the pilot opening construction 42 and the bleed opening 44 so that substantially no longitudinal thrust is placed on the plunger 16. The plunger 16 may be hexagonally cross-sectioned with an actuating slit or groove 66. A rod cavity 68 is provided for the lower end of rod 29 which is flexibly sealed by seal 70. The rod 29 is provided with a stationary pin or fulcrum 72 which is carried by a washer 71 at the lower end of the hollow externally threaded nut 74. The end of nut 74 seals the washer 71 against the rim of flexible seal 70.

The plunger 16 has two round plunger bearings 76 and 78 on each side of the rod 29 and groove 66 to allow the pressure to equalize at each end of the plunger 16. The rod 29 has a fork 80 with two inward relatively sharp edges 82 which enter the groove 66 of plunger 16.

The construction is such that there is substantially no end thrust on the plunger 16 and there is practically no turning force produced by plunger 16 on the lower end of the rod 29, about the fulcrum 72. There is substantially no manipulation force required for rod 29 in the directions 30 and 30'. The rod tends to remain where placed.

If desired, an actuation means or rod 84 may hingedly be secured to rod 29 and which passes through a stationary block 86 with a slight frictional resistance. This will maintain the rod 29 in the position selected by the user. Alternatively the rectangle 86 may represent any actuating mechanism which is to move and maintain the end of the rod 29 at any desired location. Such actuating mechanism may be a thermostatic, mechanical, electrical, vacuum or other suitable means. It can be a manually adjustable thermostatic mechanism powered by a thermostatic bulb 87 located in the outlet end of mixing chamber 11, to maintain the mixed fluid at a selected substantially constant temperature.

The pointed end piece 64 of the adjustable plunger means 16 may be adjusted by the adjustment means or rod 29 to the desired position, there to remain stationary while the diaphragm 15 and its pilot opening 42 are held spaced from the valve seat means 31 the desired distance to permit the proper flow of fluid, such as cold water, past the valve seat 31 into the passageway 32 and into the mixing chamber 11. If desired, the pilot opening 42 may have a funnel-shaped right end, FIG. 3. The construction is such that it induces proper cooperation of the pressures on each side of the diaphragm 15 by reason of the pilot opening 42 and bleed opening 44 to obtain a constant or modulated fluid flow into the orifice valve seat 31.

FIG. 8 shows a valve seat orifice wall 31A which is substantially parallel to the plane of the diaphragm support wall. The embodiment of FIG. 8 may be substituted in FIGS. 3 and 4 in an obvious manner.

The advantage of the resilient variable orifice member 17 or 17A is that it tends to neutralize the variation of the hot water and cold water ratio which occurs when the flow volume is varied at the discharge means or discharge valve 19 and faucet 27. The variable orifice 18 or 18A causes the desired ratio of hot and cold water to be maintained much more closely than is possible with the use of an invariable orifice (not shown) which also may be used instead of the variable orifice means 17.

The variable orifices 17 and 17A very materially reduce the mix temperature change as the volume at discharge valve 19 is varied, as compared by a fixed orifice in the place of the variable orifice. The discs 17 and 17A may be made of any suitable rubberlike material and may be, for example, 0.875 inches outside diameter. The radial slits 60 and 60A may have an outside diameter of 0.625 inches. The discs may be 0.063 inches thick. However, these dimensions may be varied with the size of the valve constructions, pressures involved, etc.

In a mixing valve of this type, a restriction 17 is desirable in the hot water inlet 10 to drop the pressure in the mixing chamber 11 so that the diaphragm modulating valve 14 will have sufficient pressure differential to open, to admit cold water when required for mixing. When a fixed orifice is used in the hot water inlet 10, suitably sized for normal mix flows, the mix temperature increases materially when the mix flow is decreased, as by partial closing of the downstream point of use faucet valve 19. The rise of the mix temperature under these conditions, is due to the appreciable increase in mix chamber pressure which results in a disproportionate decrease in cold water intake through the diaphragm type modulating valve 14.

Use of a variable orifice of the type disclosed herein in the hot water inlet 10 acts to provide a relatively more constant differential across the modulating diaphragm valve 14 under varying flow rates of mix water than can be obtained with a fixed orifice. When the variable orifice is used, the orifice size increases for higher flow rates and decreases for lower flow rates. Thus, under lower flow rate conditions, as the variable orifice reduces in size, the mix chamber pressure does not increase to the same degree as when a fixed orifice is used. This acts to provide the diaphragm type modulating valve 14 with a relatively higher pressure differential, allowing a more consistent proportion of cold water intake at lower flow rates, so that mix temperatures at lower flows do not rise to the same degree as when a fixed orifice is used.

The modulating action of the diaphragm 15 in combination with the longitudinally adjustable pilot plunger 16 is particularly advantageous when the plunger 16 is held at a stationary adjusted position by rod 29. The plunger end 64 may be held at a cold water flow modulating position, as shown in FIG. 3, so that a relatively smooth modulated flow of cold water flows from cold water inlet 13 to the mixing chamber 11. The diaphragm 15 is not moved by the plunger 16 to a fully closed position, during the stationary adjustment of plunger 16 under the conditions of FIG. 3 so that an improved modulated flow of cold water is obtained.

THE VARIABLE ORIFICES

FIGS. 3–5 and 9–18 show variable orifices or orifice means according to this invention, and which automatically vary the aperture means to increase the size of the aperture directly with an increase of flow rate, and vice versa.

In FIGS. 3–5 and 9–14, the rounded surface of the backing ring 54 on the downstream side provides a limit of deflection for the orifice. This contouring of the backing ring 54 predetermines the amount of opening of the orifice 18, etc., to produce characteristics of pressure drop vs. flow to suit the desired performance by the use of interchangeable backing rings.

In FIG. 15 a flat spring biased blade 110 is placed adjacent the inlet orifice 112 to tend to close such orifice 112. The blade 110 progressively opens the orifice 112 as the flow increases and vice versa, to provide a similar effect. This structure of FIG. 15 may be applied to the hot water passageway of the valve construction of FIGS. 1–8 or may be used in any other desired location.

Figure 16:
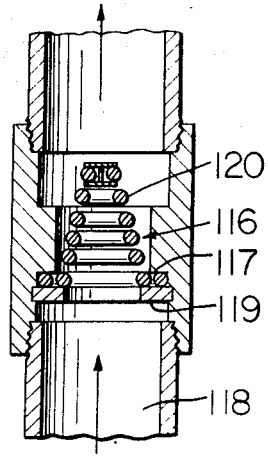

In FIG. 16 a conical spring construction 116 may be placed adjacent the inlet 118 against shoulder 117 by ring 119. The helical spring 120 progressively elongates and opens its interstice construction as the flow increases, and vice versa, with substantially the same effect as previously described. The construction of FIG. 16 may be used in connection with the hot water passageway of the valve construction of FIGS. 1–8 or may be used in any other desired location.

Figure 17:
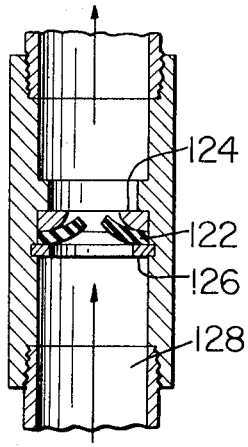

FIG. 17 shows a variable flexible orifice member 122 which may be slitted as in FIGS. 9, 10, 13 and 14 and is held by the contoured backing ring 124 and retainer split ring 126 adjacent the fluid inlet 128. The ring 124 may be contoured as described in connection with backing ring 54. The construction of FIG. 17 may be used in the valve construction of FIGS. 1–8 or elsewhere, as desired.

Figure 18:
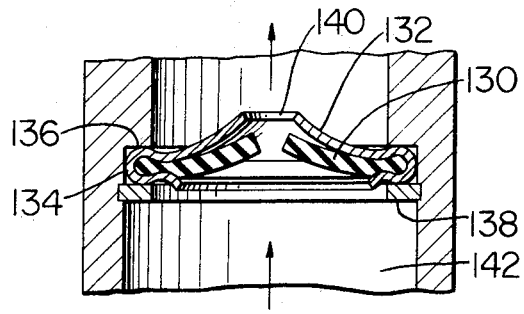

In FIG. 18, the flexible ring 130 may be slitted as in FIGS. 9, 10, 13, and 14 and may have a stamped backing ring and clamping ring 132. The outer rim 134 may be curled around the rim of the flexible ring 130. The structure may be held against the shoulder 136 by the split ring 138. The ring 130 may have a large central opening 140 to provide substantially the same backing and flow characteristics as the previously described backing rings. The fluid enters at inlet 142 and is regulated as in previous flexible orifices. The structure of FIG. 18 may be used with the hot water inlet of FIGS. 1–8 or elsewhere, as desired.

Figure 19:
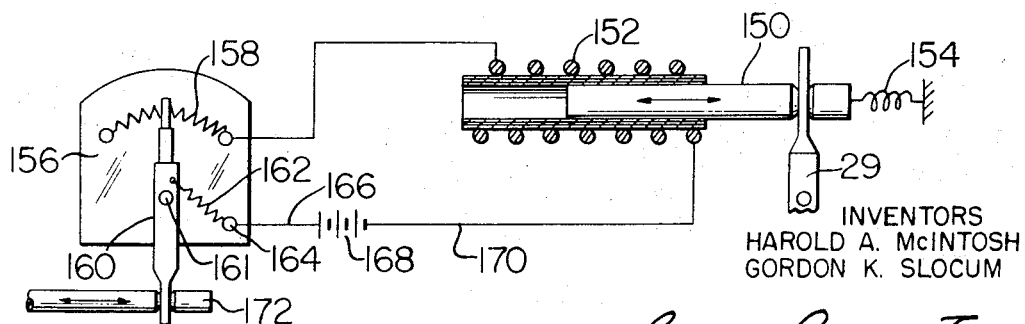
FIG. 19 shows another construction for adjusting the control lever.

FIG. 19 shows a remote control for the lever 29 of FIGS. 1–3, etc. The lever 29 is connected to the magnetic core 150 which is located in the electromagnetic coil 152. Energization of the coil 152 pulls the core or armature 150 inwardly against the resistance of the tension spring 154 to adjust the lever 29.

Any suitable remote control may be provided for the energization of the coil 152. For example, a rheostat 156 may have a variable resistance 158 connected to the coil 152 in any desired manner. For example, a contact lever 160, pivoted at 161, may sweep over the resistance 158 and produce a variable current through the coil 152. The lever may be electrically connected by flexible wire 162 to the terminal 164 which may be connected by line 166 with a battery 168 and line 170 to the coil 152. The lever 160 may be adjusted by a manually or mechanically adjustable rod 172. A variable transformer, or the like, may be used variably to energize the coil 152, if desired.

FIGS. 20 and 21 show a construction in which more than two fluid inlets are provided for the mixing chamber means 11A. A third source, or more, of fluid 25A, etc., may be added to the mixing valve construction or means 9A, which may otherwise be substantially the same as the mixing valve construction 9 of FIG. 1. The source of fluid or conduit 25A may discharge into the mixing chamber means 11A of FIG. 21, which may otherwise be substantially the same as the mixing chamber 11 of FIG. 4.

A second diaphragm 15A may be added at the left side of FIG. 21 which may be symmetrical with the diaphragm 15 of FIG. 4. A third inlet means 13A may receive fluid, if desired, from conduit 25A, and may have a fluid passageway 39A leading from conduit 25A to the diaphragm 15A and third inlet 32A into the mixing chamber 11A. The diaphragm 15A may be controlled by proper pilot construction substantially identical to and symmetrical with that of diaphragm 15, including a proper separate control lever similar to and symmetrical with lever 29, etc. Sufficient parts of the additional structure added to FIG. 4 are indicated by similar reference numerals with suffixes A so that the parts can be identified and their structure understood without further description.

The fluid entering from conduit 25A may be cold water or any other fluid, if desired.

Any further additional inlets may be added. The resilient variable orifice means 17 may be provided for the hot water inlet. Any other inlet may be provided with a resilient variable inlet means, if desired.

FIG. 22 shows a construction in which the resilient variable orifice means 17H (similar to orifice 17, etc.) may be installed in a by-pass line or conduit 210 around an element 212, such as a tubular heat exchanger, to control a substantially constant flow through the exchanger with variations in the inlet supply pressure at inlet 214. Here the variable orifice 17H responds to increase and decrease in supply pressure to permit increased or decreased flow through the by-pass 210 with a minimum change of flow through the exchanger 212. In this application, the exchange 212 acts as a fixed orifice in parallel with the variable orifice 17H. The by-pass 212 may discharge into the outlet 216.

It is thus to be seen that fluid mixing construction 9 has been provided including a first inlet means 10 with a source 24 of first fluid under a first inlet pressure, a second inlet means 32 with a source 25 of second fluid under a second inlet pressure, a mixing means 11 receiving and mixing said first fluid and second fluid and discharging such mixed fluids at outlet 12 at a lower mixed fluid discharge pressure with a pressure difference relatively to said inlet pressures, and a resilient variable orifice means, as shown in FIGS. 3–5 and 9–18 connected with one (10) of said inlets and increasing and decreasing the size of said variable orifice means in accordance with the increase and decrease in said pressure difference. The resilient orifice means may be a resilient sheet means 17, 17A, 17B, 122 or 130 with a variable orifice 18 and the like which increases in size with increasing flexure of said sheet means. A backing member 54, etc., is provided for said sheet means. Said orifice means may be the spring member 120 of FIG. 16. A power operated valve 15 is connected with the other (25) of said inlets, which power valve is a diaphragm valve with a pilot control means 16. One of the sources of fluid is from a heating means 22, both sources of fluid are sources of water, and the heating means 22 is a water heater and the sources of water are supplied from a single main (21) source of water, so that the second inlet pressure at inlet 25 is substantially the same as the inlet pressure at inlet 10.

A third, or more, inlet means may also be provided.

Certain words may be used in this specification and/or the claimed subject matter indicating direction, relative position, and the like. Such words are used for the sake of clearness and brevity. However, such words are used only in connection with the views of the drawings, and in actual practice the parts so described may have entirely different direction, relative position and the like. Examples of such words may be "vertical," "horizontal," "upper," "lower," etc.

It is thus to be seen that an improved mixing valve construction, system and method have been provided by this invention.

While the form of the invention now preferred has been disclosed, as required by statute, other forms may be used, all coming within the scope of the claimed subject matter which follows.

What is claimed is:

1. In combination, a valve construction having a cylindraceous hot water inlet wall, a cylindraceous mixing chamber wall connected and aligned with said hot water inlet wall, a cylindraceous mixed water outlet wall connected to and aligned with said mixing chamber wall, a cylindraceous cold water inlet wall perpendicular to and supported by said mixing chamber wall, a fixed cold water diaphragm seat orifice wall formed in said mixing chamber wall and connected in cold water flow relationship to said cold water inlet wall and to said mixing chamber wall, said diaphragm seat orifice wall being surrounded by a diaphragm support wall, said walls being homogeneously formed together, a diaphragm having a pilot opening construction and a bleed opening construction, a pilot chamber means sealingly holding said diaphragm on said diaphragm support wall construction, a pilot plunger means reciprocable in said pilot chamber means toward and away from said pilot opening construction, and a thermostatic means having a thermostatically responsive element in said mixing chamber wall and being operatively associated with said pilot plunger means to regulate said pilot plunger means.

2. A combination according to claim 1 with said pilot chamber means having a cylindraceous diaphragm engaging and sealing wall.

3. A combination according to claim 1 with said pilot chamber means having a pilot plunger bearing means.

4. A combination according to claim 1 with said pilot chamber means having a cylindraceous diaphragm engaging and sealing wall and having a pilot plunder bearing means.

5. A combination according to claim 1 with said thermostatically responsive element being located in said mixing chamber wall adjacent said mixed water outlet wall.

6. In combination, a valve construction having a cylindraceous first fluid inlet wall, a cylindraceous mixing chamber wall connected and aligned with said first fluid inlet wall, a cylindraceous mixed fluid outlet wall connected to and aligned with said mixing chamber wall, a cylindraceous second fluid inlet wall perpendicular to and supported by said mixing chamber wall, a fixed second fluid diaphragm seat orifice wall formed in said mixing chamber wall and connected in second fluid flow relationship to said second fluid inlet wall and to said mixing chamber wall, said diaphragm seat orifice wall being surrounded by a diaphragm support wall, said walls being homogeneously formed together, a diaphragm having a pilot opening construction and a bleed opening construction, a pilot chamber means sealingly holding said diaphragm on said diaphragm support wall construction, a pilot plunger mans reciprocable in said pilot chamber means toward and away from said pilot opening construction, and a thermostatic means having a thermostatically responsive element in said mixing chamber wall and being operatively associated with said pilot plunger means to regulate said pilot plunger means.

7. A combination according to claim 6 with said thermostatically responsive element being located in said mixing chamber wall adjacent said mixed fluid outlet wall.

* * * * *